United States Patent
Makkar et al.

(10) Patent No.: US 9,582,213 B2
(45) Date of Patent: Feb. 28, 2017

(54) OBJECT STORE ARCHITECTURE FOR DISTRIBUTED DATA PROCESSING SYSTEM

(71) Applicant: NetApp, Inc., Sunnyvale, CA (US)

(72) Inventors: Gaurav Makkar, Bangalore (IN); Srinivasan Narayanamurthy, Chennai (IN); Kartheek Muthyala, Hydershakote (IN); Stephen Daniel, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/939,760

(22) Filed: Nov. 12, 2015

(65) Prior Publication Data

US 2016/0062694 A1 Mar. 3, 2016

Related U.S. Application Data

(62) Division of application No. 13/773,119, filed on Feb. 21, 2013, now abandoned.

(51) Int. Cl.
*G06F 3/06* (2006.01)
(52) U.S. Cl.
CPC ............ *G06F 3/0629* (2013.01); *G06F 3/061* (2013.01); *G06F 3/0604* (2013.01); *G06F 3/067* (2013.01); *G06F 3/0643* (2013.01); *G06F 3/0689* (2013.01)
(58) Field of Classification Search
None
See application file for complete search history.

(56) References Cited

U.S. PATENT DOCUMENTS

| | | | | |
|---|---|---|---|---|
| 5,590,277 A | * | 12/1996 | Fuchs | G06F 11/1438 714/16 |
| 5,819,292 A | * | 10/1998 | Hitz | G06F 11/1435 707/999.203 |
| 6,526,478 B1 | | 2/2003 | Kirby | |
| 7,484,038 B1 | | 1/2009 | Aiello et al. | |
| 7,613,947 B1 | * | 11/2009 | Coatney | G06F 11/0727 714/6.1 |
| 7,747,835 B1 | | 6/2010 | Chatterjee et al. | |
| 7,886,124 B2 | | 2/2011 | Muthulingam et al. | |

(Continued)

OTHER PUBLICATIONS

File system, "In High Definition: A-Z Guide to Personal Technology," Boston, MA: Houghton Mifflin, Retrieved from http://search.credoreference.com/content/entry/hmhighdef/file_system/0, 2006, 2 pages.

(Continued)

*Primary Examiner* — Brian Peugh
*Assistant Examiner* — Dustin Bone
(74) *Attorney, Agent, or Firm* — Gilliam IP PLLC

(57) ABSTRACT

Embodiments described herein provide an object store that efficiently manages and services objects for use by clients of a distributed data processing system. Illustratively, the object store may be embodied as a quasi-shared storage system that interacts with nodes of the distributed data processing system to service the objects as blocks of data stored on a plurality of storage devices, such as disks, of the storage system. To that end, an architecture of the object store may include an on-disk layout, e.g., of the storage system, and an incore layout, e.g., of the nodes, that cooperate to illustratively convert the blocks to objects for access by the clients.

20 Claims, 7 Drawing Sheets

(56) References Cited

U.S. PATENT DOCUMENTS

| | | | |
|---|---|---|---|
| 2004/0215998 A1* | 10/2004 | Buxton | G06F 11/1402 |
| | | | 714/2 |
| 2006/0271754 A1 | 11/2006 | Shibayama et al. | |
| 2009/0300285 A1 | 12/2009 | Nagai et al. | |
| 2010/0082919 A1 | 4/2010 | Chen et al. | |
| 2011/0099351 A1 | 4/2011 | Condict | |
| 2012/0117303 A1 | 5/2012 | Carannante et al. | |
| 2012/0158650 A1* | 6/2012 | Andre | G06F 17/30457 |
| | | | 707/611 |
| 2013/0339298 A1 | 12/2013 | Muller et al. | |

OTHER PUBLICATIONS

U.S. Appl. No. 13/558,061, filed Jul. 25, 2012, 42 pages.

\* cited by examiner

OBJECT STORE ARCHITECTURE FOR DISTRIBUTED DATA PROCESSING SYSTEM

RELATED APPLICATION

This application is a divisional application of and claims priority to U.S. patent application Ser. No. 13/773,119 filed on Feb. 21, 2013, the entirety of which is incorporated herein by reference.

BACKGROUND

Technical Field

The present disclosure relates to object stores and, more specifically, to an architecture of an object store deployed in a distributed data processing system.

Background Information

In many current analytics frameworks, distributed data processing systems may be used to process and analyze large datasets. An example of such a framework is Hadoop, which provides data storage services to clients using a distributed file system and data processing services though a cluster of commodity computers or nodes. The distributed file system, e.g., the Hadoop Distributed File System (HDFS), executes on the cluster of nodes to enable client access to the data in the form of logical constructs organized as blocks, e.g., HDFS blocks. Each node of the cluster typically has its own private (i.e., shared-nothing) storage and employs a native file system, such as ext3/4 or XFS. The native file system typically has a plurality of features directed to management of the data in the form of logical constructs organized as files. As a result, the distributed file system may be employed to access the data as blocks, while the native file systems executing on the cluster of nodes may be employed to store and process the blocks as one or more files.

Often it may be desirable to avoid the use of a native file system in certain deployments of distributed data processing systems because many of the features provided by the native file system may not be required. For example, a feature of a native file system is its compliance with the Portable Operating System Interface (POSIX) standard, which requires exposing file handles to clients to enable access, e.g., reading and writing, to files in accordance with a full set of operations. The distributed data processing system may not require POSIX compliance because there may only be a limited set of operations, such as open, read and verify checksum, needed by the distributed file system to access blocks. Thus, the overhead associated with the many features provided by a native file system may not be appropriate for the distributed data processing system deployment.

Accordingly, it may be desirable to provide a storage solution to distributed data processing systems that eliminates the overhead associated with native file systems. In addition, it may be desirable to provide a generic storage solution that may be deployed in distributed data processing systems that employ data management systems, such as distributed file systems and distributed database management systems.

SUMMARY

Embodiments described herein provide an object store that efficiently manages and services objects for use by clients of a distributed data processing system. Illustratively, the object store may be embodied as a quasi-shared storage system that interacts with nodes of the distributed data processing system to service, i.e., access, the objects as blocks of data stored on a plurality of storage devices, such as disks, of the storage system. To that end, an architecture of the object store may include an on-disk layout, e.g., of the storage system, and an incore layout, e.g., of the nodes, that cooperate to illustratively convert the blocks to objects for access by the clients.

In one or more embodiments, the on-disk layout of the object store may be implemented as one or more volumes, wherein each volume is a container of objects. Each volume may include a plurality of segments, wherein one segment is a master segment and the other segments are data segments. Each segment may be formed from a range of bytes within a logical unit number (lun) constructed from one or more disks of the storage system. A lun range thus defines a location of a segment within a volume. Illustratively, a chunk is a unit of storage within the on-disk layout of the object store. The data segments of a volume are provided to allocate, store, retrieve and recover chunks, including their data and metadata. The chunks stored on a data segment may be chained (linked) together to form one or more blocks of the volume. The master segment contains block layout information for the volume, including information that links a collection of chunks together as blocks.

In addition, the incore layout of the object store may be implemented as incore data structures of the nodes. One or more blocks of a volume may be retrieved from disk and loaded into memory ("incore") of a node, where each block is represented as an object. That is, an object is an on-disk block which, in turn, is a collection of linked chunks. Data structures, such as an object accessor, an object descriptor and a chunk descriptor, are maintained incore to describe and enable access to the object and its constituent chunks. Illustratively, the chunk descriptor describes a chunk with respect to its size, an amount of data and a current state, whereas the object accessor and object descriptor enable access to the chunks of the object via a linked list of chunk descriptors.

Advantageously, the object store may be configured to service objects in a manner that is adaptable to various data management system deployments, including distributed file systems and/or distributed database management systems, that support object-level management utilizing, e.g., the quasi-shared storage system of the distributed data processing system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
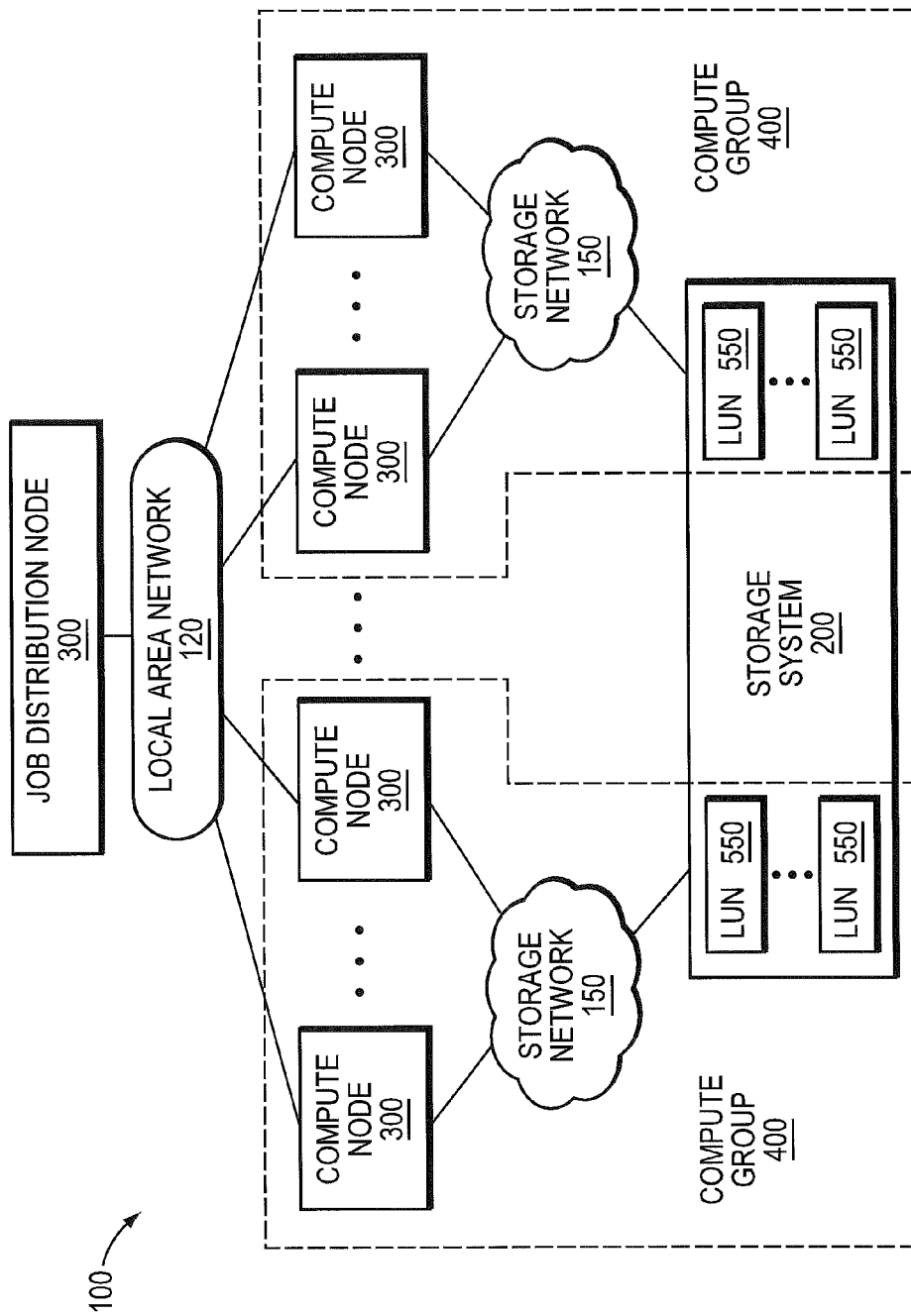
FIG. 1 is a block diagram of a distributed processing system.

FIG. 1 is a block diagram of a distributed processing system 100 that may be advantageously used with one or more embodiments described herein. The distributed system 100 may be organized as a plurality of computers or nodes 300, including a master node ("job distribution node") and a cluster of slave nodes ("compute nodes"), connected to a first network, e.g., a local area network 120. The distributed system 100 may also include a storage system 200 coupled to the compute nodes 300 by one or more second networks, e.g., storage networks 150. The storage network 150 may include one or more point-to-point links, a shared local area network, a wide area network or a virtual private network implemented over a public network, such as the well-known Internet. The distributed system 100 may be used to process and analyze large datasets by partitioning the datasets into blocks for distribution and processing among the compute nodes 300. The compute nodes 300 may be assembled into compute groups 400 and configured such that each compute group includes a storage network 150 to enable access to data segments of logical unit numbers (luns) 550 stored on the storage system 200 and allocated to the compute group 400. The data segments are provided to allocate, store, retrieve and recover units of storage organized as chunks, which are chained (linked) together to form one or more blocks or objects, as described further herein.

Figure 2:
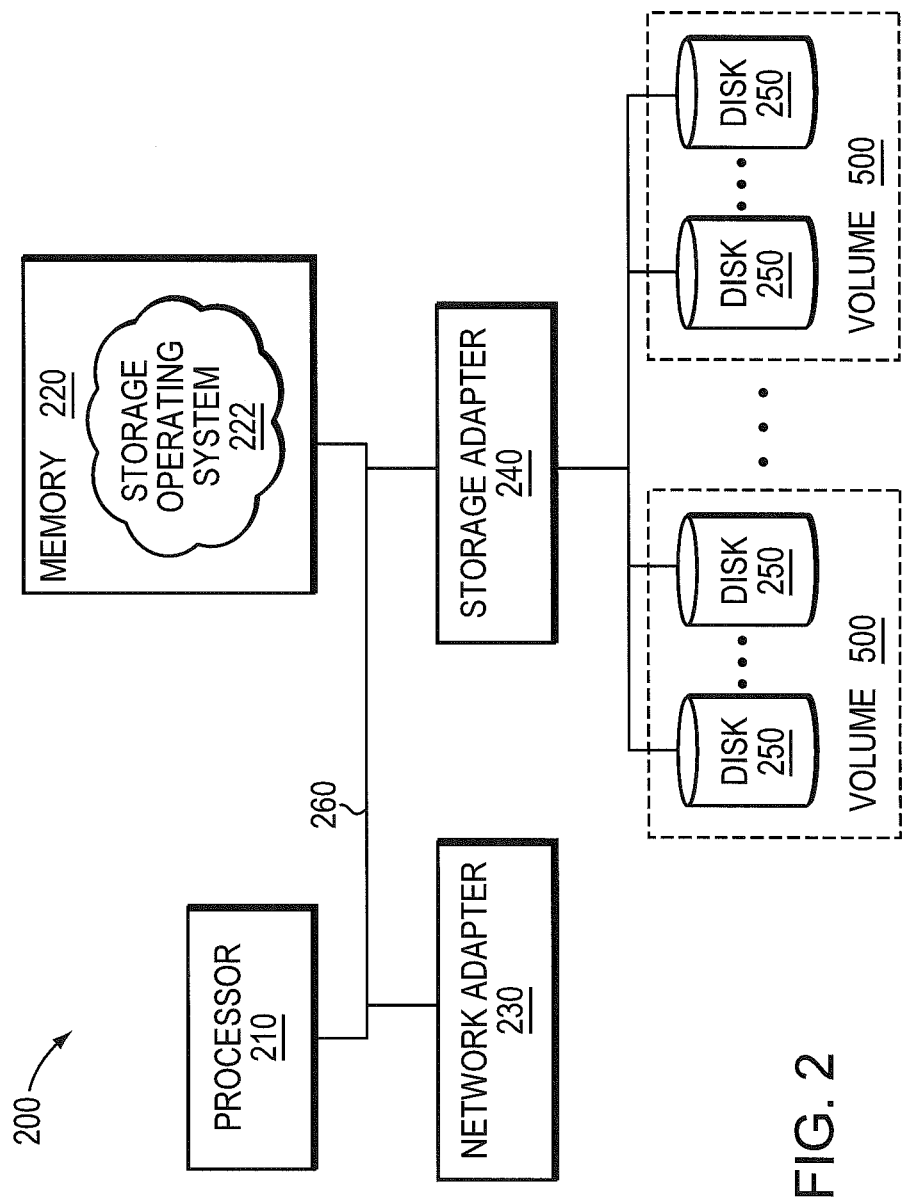
FIG. 2 is a block diagram of a storage system of the distributed data processing system.

FIG. 2 is a block diagram of storage system 200 that may be advantageously used with one or more embodiments described herein. The storage system 200 may be a computer coupled to a plurality of disks 250 and having features such as simplicity of storage service management and ease of storage reconfiguration, including reusable storage space, for users such as nodes 300. In addition, the storage system 200 may be configured to interact with the nodes 300 to enable service of data, e.g., stored on the disks 250 or other similar media adapted to store data, in file system and block formats with high reliability and integrity through the use of data protection and management techniques, such as persistent point-in-time read-only images of the data, and/or Redundant Array of Independent (or Inexpensive) Disks (RAID) implementations.

The storage system illustratively includes a processor 210, a memory 220, one or more network adapters 230 and a storage adapter 240 interconnected by a bus 260. Each network adapter 230 includes the mechanical, electrical and signaling circuitry needed to connect the storage system to the nodes 300 over network 150. The storage system 200 may also include a storage operating system 222 that illustratively provides a file system to logically organize the data as a hierarchical structure of, e.g., named directory, file and lun storage elements on disks 250. The file system may be configured to provide volume management capabilities for use in block-based access to the data stored on disks 250. These capabilites may include (i) aggregation of the disks, (ii) aggregation of storage bandwidth of the disks, and (iii) reliability guarantees, such as synchronous mirroring and/or parity (RAID).

Storage of data on the storage system 200 may be implemented as one or more storage volumes 500 that include a group of the disks 250, defining an overall logical arrangement of disk space. The disks within a volume 500 are typically organized as one or more RAID groups. RAID implementations enhance the reliability/integrity of data storage through the writing of data "stripes" across a given number of physical disks in the RAID group, and the appropriate storing of redundant information with respect to the striped data. The redundant information enables recovery of data lost when one or more storage devices (e.g., disks) fails.

In an embodiment, the storage system 200 may interact with the nodes 300 to provide a quasi-shared storage system infrastructure of the distributed system 100, as described herein. To that end, the storage adapter 240 may cooperate with the storage operating system 222 to access (e.g., retrieve via a read operation or store via a write operation) data requested by the nodes. The storage adapter may include I/O interface circuitry that couples to the disks over an I/O interconnect arrangement, such as a conventional high-performance, FC serial link topology. The data may be retrieved or stored on disk 250 by the storage adapter and, upon completion, either the retrieved data or an acknowledgement (generated by the processor 210 or the adapter 240) may be forwarded over the bus 260 to the network adapter 230, where it is formatted into one or more packets or messages and forwarded to the nodes.

Figure 3:
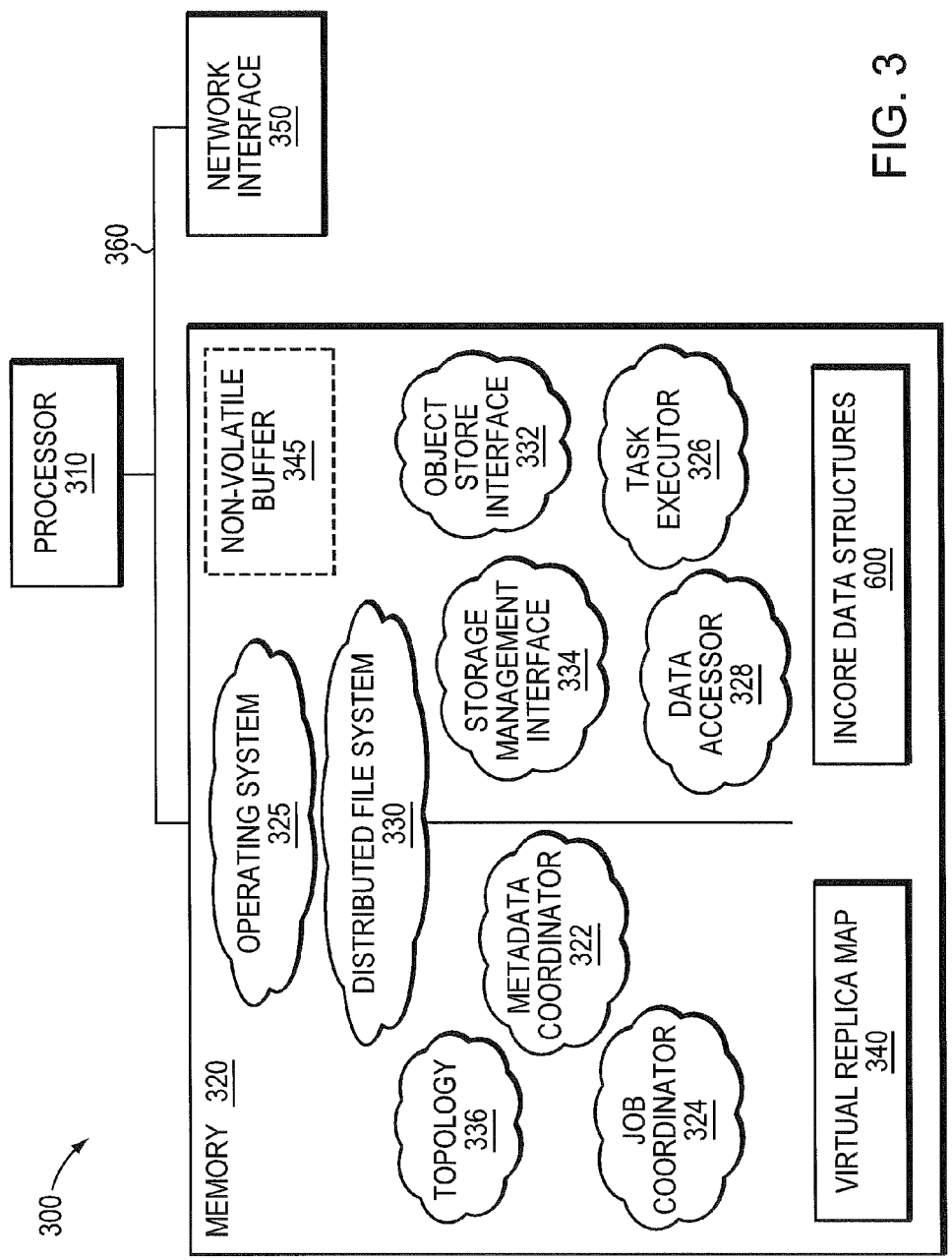
FIG. 3 is a block diagram of a node of the distributed processing system.

FIG. 3 is block diagram of node 300 that may be advantageously used herein as, e.g., the job distribution node or compute node. In one or more embodiments, the node 300 may be embodied as a physical machine, such as computer, or a virtual machine executing on the computer. However, as described herein, the node 300 is illustratively embodied as a computer including a processor 310 coupled to a memory 320 and one or more network interfaces 350 by a bus 360. The network interface 350 may contain the mechanical, electrical and signaling circuitry for communicating data over physical and/or wireless links coupling the node to other nodes and/or the networks. The network interface 350 may be configured to transmit and/or receive data using a variety of communication protocols including, inter alia, the Transmission Control Protocol/Internet Protocol (TCP/IP), wireless protocols and/or Ethernet protocols.

The memory 320 includes a plurality of storage locations addressable by the processor 310 and/or network interface 350 for storing software programs (e.g., processes and/or services) and data structures associated with the embodiments described herein. The processor and interface may, in turn, include processing elements and/or logic circuitry configured to execute the software programs and manipulate the data structures, such as virtual replica map 340 and incore data structures 600. An operating system 325, portions of which are typically resident in the memory 320 and executed by the processor 310, functionally organizes the node by, inter alia, invoking operations in support of the software processes, services and/or application programming interfaces (APIs) executing on the node. A suitable operating system 325 may include the UNIX® series of operating systems, the Microsoft Windows® series of operating systems or other similar operating system; however, in an embodiment described herein, the operating system is illustratively the Linux® operating system.

Besides the operating system 325, a data management system, such as a distributed database management system or, illustratively, a distributed file system 330, provides data storage services in support of an analytics framework of the distributed data processing system 100. A distributed file system 330 that may be advantageously used with the embodiments described herein is the Hadoop Distributed File System (HDSF) which, illustratively, performs write-once, read-many (WORM) high-throughput, parallel streaming access to a workload, e.g., a dataset. The distributed data processing system 100 illustratively provides an architecture that facilitates distributed data analytics wherein multiple analytics jobs may be run on the dataset. To that end, the architecture may employ data analytic processes/modules to store the dataset on the storage system 200 and partition the dataset into blocks, e.g., HDFS blocks, for distribution among the nodes 300, and to enable processing of the blocks by the nodes. In one or more embodiments, the architecture may further employ a distributed hash algorithm to calculate the locations of the blocks in the system. If a block is not available in a particular calculated location, e.g., in the memory 320 of a respective node 300, the block may be fetched from the dataset stored on the storage system 200 and forwarded to the respective node.

In the case of a node 300 embodied as the job distribution node, the software processes and/or services may include data analytic processes such as a metadata coordinator 322 and a job coordinator 324, whereas in the case of the compute node, the data analytic processes may include a task executor 326 and a data accessor 328. It will be apparent to those skilled in the art that other processor and memory types, including various computer readable media, may be used to store and execute program instructions pertaining to the disclosure described herein. Also, while the description illustrates various processes, it is expressly contemplated that the various processes may be embodied as modules configured to operate in accordance with the disclosure herein (e.g., according to the functionality of a similar process).

In one or more embodiments, the metadata coordinator 322 contains computer executable instructions executed by the processor 310 to perform operations that manage the distributed file system namespace and control access to objects, such as partitioned blocks of the dataset, residing on the storage system 200. Illustratively, the management and control operations may include, e.g., retrieving the partitioned blocks of a dataset from the storage system for distribution to the compute nodes and tracking the locations of those blocks in the system. The job coordinator 324 contains computer executable instructions executed by the processor 310 to perform operations that manage each analytics request (or "job") received from a client of the system 100. The job coordinator 324 may further perform operations to divide the job into sub jobs (or "tasks"), assign/schedule the tasks among the compute nodes, and communicate with the task executors running on the nodes. As used herein, a task illustratively involves issuing a request for a block (object) that the task may subsequently process to produce a result.

Each task executor 326 contains computer executable instructions executed by the processor 310 to perform the tasks assigned to the compute node. The task executor 326 may communicate the data accessor 328 to retrieve one or more blocks needed to process the assigned task. The data accessor 328 contains computer executable instructions executed by the processor 310 to perform operations that manage access to the storage system 200. Illustratively, the management operations may include access (e.g., read/write) operations directed to the blocks stored on the system 200 and serviced by the data accessor 328, as well as block creation, deletion and replication.

As noted, a distributed file system that may be advantageously used with the embodiments described herein is HDFS, which is typically configured to service data as HDFS blocks. HDFS typically runs on top of a native, general-purpose file system, e.g., ext3/4 or XFS. The HDSF blocks are served as files by the native file system, which typically has a file-like interface (such as POSIX) to HDFS. The embodiments described herein essentially replace the native file system with an object store. Accordingly, the HDFS blocks are stored as objects which, in turn, are stored as chunks. Functionality related to files, block management, and block metadata management with respect to the native file system are replaced with the object store, which manages its own block metadata, block data and chunk data.

In an embodiment described herein, a first API layer, i.e., object store interface 332, is provided to enable access to data stored on the object store. Note that in the context of Hadoop, the first API layer may be referred to as FSDataset. Illustratively, the object store interface 332 is an API layer interface to the data accessor 328 of compute node 300. Unlike the POSIX-like interface, the object store interface manages HDFS blocks using operations, such as read HDFS block, write HDFS block, check HDFS block metadata and read HDFS block metadata. In essence, the object store interface 332 transforms the HDFS blocks into objects, blocks and chunks for storage on the object store. In addition, a DataStorage interface (not shown) to the data accessor 328 may provide meta operations, such as formatting a volume, checking for consistency of a volume, and similar fsck utilities.

Figure 4:
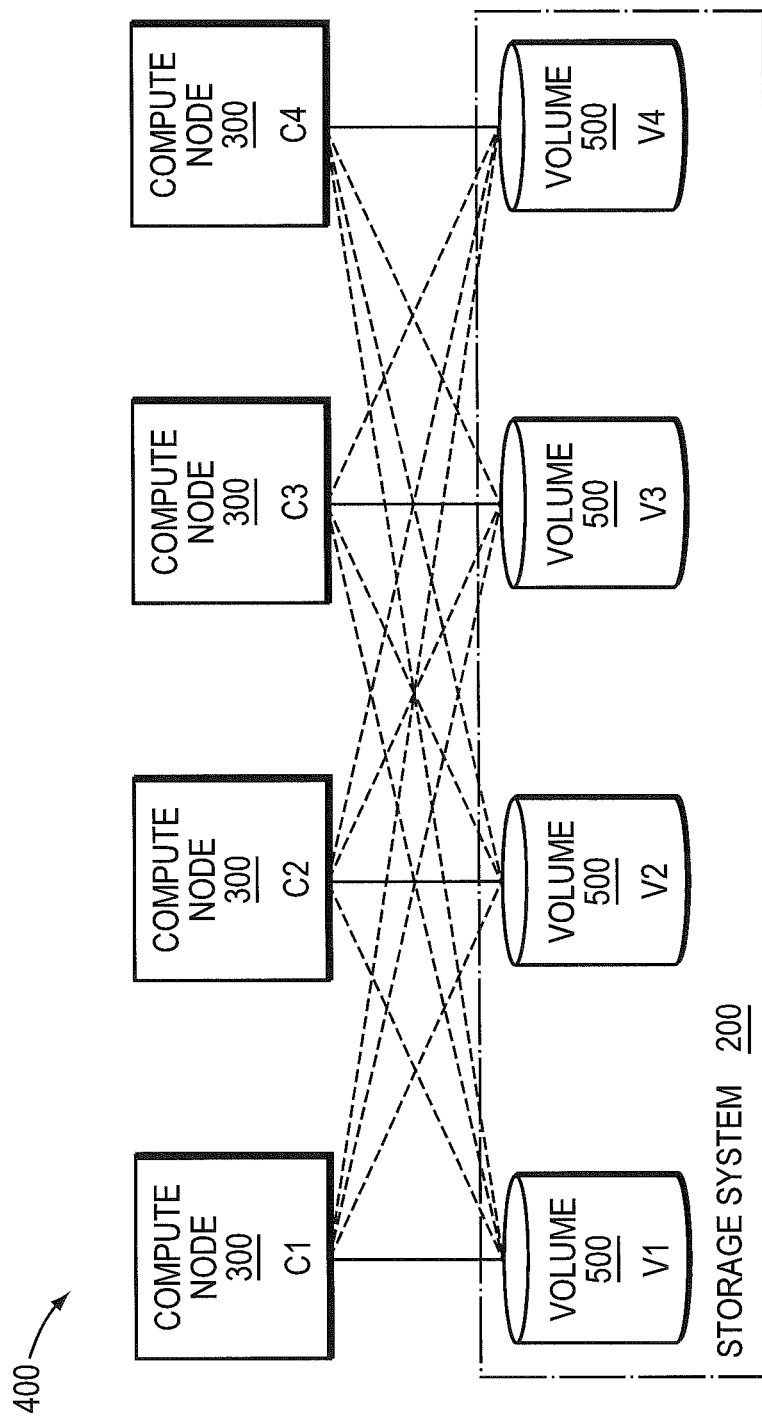
FIG. 4 is a block diagram of a compute group of the distributed data processing system.

In a traditional Hadoop-type distributed data processing system, each compute node has its own local, private storage that services HDFS blocks. Unlike the embodiments described herein, the Hadoop-type of distributed data processing system does not assemble the compute nodes into compute groups that include mapped volumes. A second API layer, i.e., a storage management interface 334, illustratively transforms a traditional Hadoop-type system into a distributed data processing system having compute nodes coupled to a quasi-shared storage system of the object store to form one or more compute groups. Note that in the context of Hadoop, the second API layer may be referred to as StoragePlugin. FIG. 4 is a block diagram of a compute group 400 of the distributed data processing system that may be advantageously used with one or more embodiments described herein. The storage management interface 334 is illustratively another API layer interface to the data accessor 328 that enables read-write (RW)/read-only (RO) mappings of compute nodes 300 and corresponding volumes 500 within the compute group 400. For example, each compute node 300 of the compute group 400 may have RW access (denoted by the solid lines) to a specified volume 500 mapped into the compute node and RO access (denoted by the dashed lines) to the remaining volumes mapped into the compute node. Illustratively, the storage management interface 334 provides the functionality of differentiated mapping, e.g., the specified volume V1 being mounted/mapped as RW access for compute node C1 of the compute group 400 and that volume V1 being mounted/mapped as RO access for the other compute nodes C2-C4 of the compute group.

If a client of the traditional Hadoop-type distributed data processing system requests processing (e.g., reading or writing) of a block, the job coordinator 324 of the job distribution node 300 determines which compute node may process the block, and then schedules processing at the compute node. However in the embodiments described herein, write operations directed to a specified volume are processed by one compute node in a compute group, while read operations to that volume may be processed by all other compute nodes in the group. Accordingly, the job coordinator 324 may be configured for this architectural change to the distributed data processing system. For example, in response to a write request received from a client, the job coordinator 324 may schedule the write to only one compute node of a local compute group that has RW access to the specified volume. Yet for read requests, the job coordinator may balance those requests (load balance) across all compute nodes of the local group, each of which has RO access to the volume. Furthermore, compute nodes of a remote compute group may also have RO access to the volume, but only over network 150. Those nodes of the remote compute group illustratively have a lower priority to the specified volume, as opposed to the nodes of local compute group (which have a higher priority). A third API layer, i.e., Topology 336, provides information to the job coordinator 324 about the organization of the distributed data processing system 100, e.g., the local/remote compute groups 400 and scheduling of reads/writes to nodes 300 of a compute group. To that end, the Topology 336 is illustratively an API layer interface to the job coordinator 324.

Furthermore, a traditional Hadoop-type distributed data processing system typically utilizes the notion of replicas to provide, e.g., reliability to the system. In such a traditional system, each compute node has its own local, private storage to service HDFS blocks. If a compute node that stores a block (and is scheduled to process that block) fails, the block can be read from the local storage of another node that stores a replica of that block. Thus, the traditional system has the notion of a replication factor, which is typically three (3), i.e., 3 copies of the data may be stored on the compute nodes of the distributed data processing system. However, the embodiments described herein enable storage of only one copy of the data on a volume 500 of the object store, which improves the efficiency of storage, but allows all of the, e.g., four (4), compute nodes 300 of a compute group 400 read access to that data within the volume, thus improving data availability. The improved data availability is manifested as virtual replicas that obviate the use of replication factors. Illustratively, a storage administrator may alter the replication factor, e.g., from 3 to 1, and the job coordinator 324 of the job distribution node may use virtual replica map 340 to schedule reads of the data at any of the compute nodes of the compute group.

In an embodiment, the virtual replica map 340 is a data structure maintained by the job coordinator 324 to identify the RW and/or RO mappings of each compute node to each volume of a compute group. The virtual replica map 340 is illustratively populated by block maps, e.g., a list of blocks or objects stored on mapped volumes, provided by the compute nodes 300 of each compute group 400 in the distributed data processing system 100. That is, each of the compute nodes of a compute group may report all of their virtual (e.g., RO) and physical (e.g., RW) mappings of blocks (objects) within a volume 500 to the job coordinator. Armed with the virtual replica map, the job coordinator 324 may resolve the virtual/physical mappings of each compute node of a compute group. Thus, the virtual replica map 340 enables the job coordinator to provide load balancing and redirecting of read and write traffic across the nodes of the distributed data processing system.

Object Store

Embodiments described herein provide an object store that efficiently manages and services objects for use by clients of the distributed data processing system. Illustratively, the object store may be embodied as a quasi-shared storage system that interacts with the nodes of the distributed data processing system to service, i.e., access, the objects as blocks of data stored on a plurality of storage devices, such as disks, of the storage system. To that end, an architecture of the object store may include an on-disk layout, e.g., of the storage system, and an incore layout, e.g., of the nodes, that cooperate to illustratively convert the blocks to objects for access (service) by the clients. As described further herein, the on-disk layout of the object store may be implemented as one or more volumes 500, wherein each volume is a container of objects. The volumes (including their respective objects) may be cross-mapped into each of the compute nodes 300 in a compute group 400 so that any compute node in the group 400 can access any of the objects (or chunks) stored on the respective volume 500 of the storage system 200. Therefore, the quasi-shared storage system 200 may be configured to relax the restriction of private (shared-nothing) storage of the compute nodes 300 to allow shared storage access of the object store within a compute group 400.

For example, each compute node C1-C4 illustratively has RW access to a specified volume V1-V4 mapped into the compute node and RO access to the remaining volumes mapped into the compute node. The mapping of the compute node is illustratively indicated by a configuration file (of the node) having a plurality of configuration parameters, including a storage identifier associated with a volume identifier of the specified volume and a list of the remaining volumes within the compute group 400, e.g., by path names. Upon boot or restart, the volume identifier of a volume 500 is loaded into memory 320 of the compute node and compared with the storage identifier of the configuration file. If the storage identifier matches the volume identifier, the compute node has (by default) RW access to the volume. Otherwise, the node has RO access to the volume.

The RW and RO mapping access of compute nodes within a compute group obviates a need for monitoring-type of communication, such as heartbeat messages, among the nodes to ensure high availability of the distributed data processing system 100. For example, if a compute node with RW access to a specified volume fails, read traffic (requests) directed to objects stored on the volume may be routed (e.g., by cluster management software) to the remaining nodes of the compute group 400, which have RO access to the volume. A write request creates a new HDFS block. If the write request succeeds in finalizing the block before a node failure, then the block is fully written and available. If a node fails while a block is being written, the entire write fails and is retried (e.g., by the cluster management software). Retried write requests can be routed to another node and can be stored on another volume to which that node has RW access. Data access is thus contention-free (i.e., lock-free) because only one compute node of the compute group may modify the objects (or chunks) stored in a specified volume. An example of a distributed processing system that is configured to provide compute nodes with high-availability, contention-free access to chunks stored on a storage system is disclosed and described in U.S. patent application Ser. No. 13/558,061, filed Jul. 25, 2012 and titled Contention-Free Multi-Path Storage Access in Distributed Compute Systems, by Gaurav Makkar, et al.

On-Disk Layout

Figure 5:
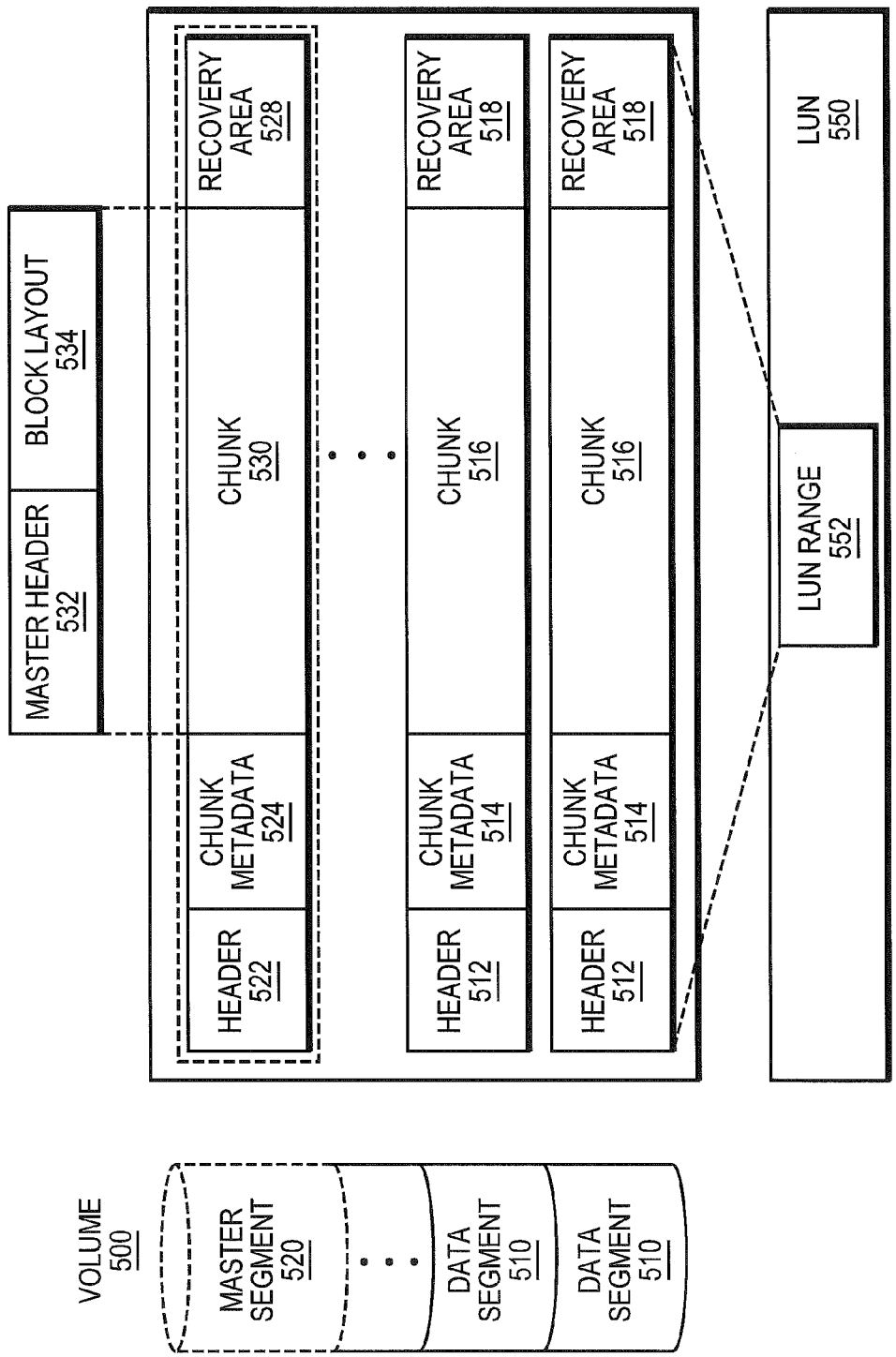
FIG. 5 is a block diagram of an on-disk layout of an object store of the distributed data processing system.

FIG. 5 is a block diagram of an on-disk layout of the object store that may be advantageously used with one or more embodiments described herein. In or more embodiments, the on-disk layout is illustratively implemented as one or more volumes 500, wherein each volume is a container of objects. Specifically, the volume 500 may include a plurality of segments, wherein one segment is a master segment 520 and the other segments are data segments 510. Each segment may be formed from a range of bytes within a lun 550 constructed from one or more disks 250 of the storage system 200. A lun range 552 thus defines a location of a segment within the volume 500. Illustratively, the lun range 552 may be a contiguous range of bytes within a lun 550, although it will be understood to those skilled in the art that the range of bytes need not be contiguous. That is, instead of a physical range of disk space (i.e., disk blocks) constituting lun 550, a virtual range of disk space could constitute the lun, wherein the disk blocks of the virtual range of disk space may be written anywhere on disk (e.g., by a write-anywhere file system) and organized as lun range 552 by, e.g., linking of the blocks throughout the storage array.

Accordingly, the volume 500 may contain multiple lun ranges 552, one for each data and master segment of the volume. Illustratively, each segment does not have to be contained within the same lun 550 to form the volume 500. That is, different segments (i.e., different lun ranges 552) of different luns 550 may be organized as the volume 500. As an example, the volume may constitute four segments "carved out" (formed from) two luns 550, wherein three of the segments may be formed from a first lun and one of the segments may be formed from a second lun. As a result, a size or capacity of the volume may be grown or shrunk quickly and efficiently. For instance, to grow the capacity of the volume, a system administrator need only add more data segments 510 to the volume. The various segments of the various luns 550 may then be organized as the volume 500 using identifiers, as discussed further herein.

In one or more embodiments, each data segment 510 has an on-disk layout organized as a plurality of fields, including a header field 512, a chunk metadata field 514, a chunk field 516 and a recovery area field 518. Illustratively, a chunk is a unit of storage within the on-disk layout of the object store. The data segments 510 of volume 500 are provided to allocate, store, retrieve and recover chunks, including their data and metadata. To that end, the header field 512 generally contains information about the data segment, including a size of the segment, a size of the chunk(s) stored within the segment, a storage location of different components/areas of the segment (i.e., the lun within which the segment is stored) and the volume to which the segment belongs. Each data segment is associated with other data segments to form the volume using various identifiers contained in the header field 512. One such identifier is a lun identifier (lun id) that provides the association of the data segment to a lun. The lun id includes an offset within the lun and a size of the segment constituting the lun range. Illustratively, the lun id is located in the header field 512 of each data segment 510 because that lun id may be different for each segment. Another identifier is a volume identifier (volume id) that, among other things, operates to associate the data segments collectively as volume 500.

The chunks (e.g., data content) are stored in the chunk field 516 of the data segment 510. As used herein, allocation of a chunk denotes adding a chunk to the chunk field 516 and deallocation of a chunk denotes deleting or removing a chunk from the chunk field 516. Allocation and deallocation of chunks are fundamental operations in the object store because of the WORM workload environment within which the object store illustratively operates. Once written and allocated, a chunk cannot be modified (written again); it can only be deleted/deallocated. Therefore, a simple chaining of chunks is all that is needed. To modify its data content, the chunk is deallocated (deleted) and then allocated (written); that is, the chunk is not modified in place. Metadata is provided for managing and tracking the allocation/deallocation of chunks within the chunk field 516 of the data segment 510. The chunk metadata information (i.e., allocation/deallocation information) is stored in the chunk metadata field 514. Illustratively, there is chunk metadata stored in the chunk metadata field 514 for each corresponding chunk stored in the chunk field 516. Each chunk metadata may specify whether the corresponding chunk has been allocated (or deallocated) and, if allocated, to which client or application it has been allocated. Thus, the client that allocated or deallocated the corresponding chunk may be identified by the chunk metadata (e.g, by context).

The recovery area field 518 contains recovery information that identifies any change made to the chunk metadata. Illustratively, the recovery information includes a transaction identifier that uniquely identifies the recovery information, an action (such as an allocation or deallocation operation) and a checksum for use in error correction during replay/recovery of checksum-related data. The allocation or deallocation operation, including a change of state, of a chunk in the data segment 510 is written to or "logged" in the recovery area field 518. A change of state of the chunk denotes a change or transition to the chunk metadata of the chunk; the allocation/deallocation of a chunk illustratively transitions through certain states. For example, the states of a chunk may include partially allocated, partially filled, not yet finalized, allocated and deallocated. Information about the transition through those states is illustratively logged in the recovery area field 518.

In an embodiment, one compute node 300 of a compute group 400, i.e., the compute node with RW access or mapping to a volume, may mount the volume and log the recovery information in the recovery area field 518 of a data segment 510 of the volume, while the other compute nodes of the compute group may only read that information via their RO mappings to the mounted volume. Once the recovery information is read, the other compute nodes can replay the metadata from the recovery area field 518 in accordance with a logical replay and reconstruct the "view" logged by that metadata to update ("catch up with") the operations rendered by the RW mapped compute node. Notably, a logical replay occurs during steady-state when a RO mapped node needs to catch up with the metadata advancements of a RW mapped node. The other compute nodes may read the recovery information and reconstruct the chunk metadata changes (e.g. allocation, deallocation, change of state) within their own compute environments, thereby avoiding modifications at the storage system 200 and obviating any contention among the compute nodes.

However if the RW mapped node writes the recovery information at substantially the same time as an RO mapped node reads that information, the RO mapped node may read stale data. Accordingly, the RO mapped node may be configured to check the correctness of the updated recovery information it reads. Illustratively, the RO mapped node may check the transaction identifier and operation, as well as the checksum to verify it is reading the correct recovery information. The transaction identifier is illustratively a monotonically increasing value; the node may thus check a previous transaction to ensure that the current recovery information being read has an incremented value and is thus correct. The checksum value is illustratively based on the recovery information contents and is also checked by the node to verify correctness. If any of these checks fail, the RO mapped node may perform a software reboot, e.g., remount the volume, to reload the information.

In addition, it is possible that the RW mapped node may fail (crash) during flushing (writing) of the metadata (recovery information) to one or more disks of a volume (e.g., upon swapping of recovery log areas) such that the updates are not complete. Here, some of the recovery information may have been stored to disk, while the rest of the recovery information may need to be replayed, e.g., based on operations stored in a non-volatile buffer 345 of the node's memory 320, after a software reboot and remount of the volume. In response, the RW and RO mapped nodes may perform a physical replay to retrieve the persisted recovery information from the mounted volume and compare that retrieved information with the recovery information associated with the operations stored in the non-volatile buffer 345 to determine what information needs to be replayed. Note that, as opposed to a logical replay which occurs in steady-state, a physical replay occurs in response to a crash. The RW and RO mapped nodes do not replay the recovery information that was stored on disk; they abort those operations and only replay the operations that did not result in recovery information being stored on disk.

Illustratively, the volumes 500 of a compute group 400 may be remounted to be lock-free, free-running and to assist error handling. Assume a RO mapped compute node of the compute group loads a RO volume, including metadata associated with one or more chunks, e.g., of a block (object), and metadata (recovery information) to enable the node to replay the transitions/operations for that block (object) that were persistently stored on disk. This, in turn, allows the RO mapped node to update the metadata to be current with the transitions/operations performed by the RW mapped node. If an error is detected during update of the metadata, the RO mapped node may perform a software reboot to reload the incore data structures 600, as well as the recovery information. Illustratively, error handling involves the RO mapped node retrieving the recovery information from the RO volume so that it "catch-up" with the changes/updates made by the RW mapped node. Advantageously, this process avoids any locking of storage on the object store.

Assume also that the RW mapped node renders updates to the recovery information in memory 320 (or other media) and those updates are not immediately written (flushed) to disk(s) of the mounted volume. If the RO mapped node reads the recovery information of the mounted volume, it will not be able to catch-up with the updates rendered by the RW mapped node because those updates are still in memory of the RW mapped node and not accessible to the RO mapped node. To obviate this situation, the RW mapped node may be configured to perform "direct I/O operations" on its mapped volume to ensure that the updates (e.g., to both data and recovery information) are written directly to disk, bypassing memory or other intermediate media copies. In this manner, direct I/O operations allow other compute nodes to share and synchronize data/information. That is, the updated data and/or recovery information may be written directly to the appropriate data segment 510, including the recovery area 518, of the volume 500 by the RW mapped node so the RO mapped nodes can immediately access the data/information to, e.g., catch-up with the recovery information updates and/or read the data to process a compute task.

Illustratively, a data segment 510 is not dependent upon (and thus is unaware of the presence of) another data segment within a volume; the data segments of the volume are totally isolated. Accordingly, the data segment 510 may be defined as a fault boundary, which means that if a failure occurs to the segment, the failure is totally contained within the segment. Such a fault boundary eliminates a single recovery area (and single point of failure) for an entire volume. Only the master segment 520 is aware of the presence other data segments 510 in the volume 500. Illustratively, the master segment contains information sufficient to organize all of the data segments within the volume. The organization of the volume ensures that each data segment 510 is independent of each other data segment and, if a failure occurs on a storage device (e.g., disk 250) or lun range 552 that constitutes the particular data segment, the failure is isolated within that data segment 510. Although this organization advantageously obviates the destruction of the volume in response to a failure of a data segment, the content of the failed data segment can still be recovered using error detection and correction techniques (such as RAID) on the storage system 200.

In one or more embodiments, the master segment 520 has an on-disk layout that is generally similar to that of the data segment 510. That is, the master segment 520 is organized as a plurality of fields, including a header field 522, a chunk metadata field 524, a chunk field 530 and a recovery area field 528. The header field 522 generally contains metadata information about the master segment, including a size of the segment, a storage location of the segment (i.e., the lun id within which the segment is stored) and the volume (id) to which the segment belongs. The chunk metadata field 524 identifies changes (e.g., allocation or deallocation) to the master segment 520 and the recovery area field 528 logs those changes.

However, the chunks field 530 of the master segment 520 is specially formatted to include a master header sub-field 532 and a block layout sub-field 534 pertaining to the layout of a block. Illustratively, a block is a logical construct that resides in volume 500 and includes a collection of chunks. The size of a block can vary, e.g., the block can include one chunk or a substantially large number of chunks. A chunk may be allocated to a block; otherwise, the chunk is freed (i.e., deallocated). The allocation/deallocation information of a chunk is tracked and managed at the data segment level and, thus, is not maintain in the master segment 520.

The chunks stored on a data segment 510 may be chained (linked) together to form one or more blocks of the volume 500; illustratively, the master segment 520 contains block layout information for the blocks contained in its volume. In an embodiment, the chunks stored in the data segment 510 may be organized as one or more blocks and (metadata) information related to the data/chunks of blocks contained within the data segment may be represented as a block layout. Note that the block layout contains a description of the blocks that are stored in a particular data segment 510 of the volume 500, i.e., each data segment 510 has its own block layout. Note further that a block may generally span one data segment (a block generally does not contain chunks from different segments). Thus, the block layout information may be provided per data segment.

Illustratively, the master header sub-field 532 contains information such as the number of data segments 510 in the volume 500, the number of block layouts for the data segments 510 and the offset at which each block layout starts. The block layout sub-field 534 contains block layout information, including client-specific metadata, for all blocks that are stored within a corresponding data segment 510. Assume a client requests writing of a block; the block layout information may include an identification of the block (block id), the size of the block, client (user) permissions and checksum of the data of the block. In an embodiment, the block layout sub-field 534 may include information (e.g., metadata) that specifies the linking of chunks of a block via pointers to the chunks of the block, as well as a 64-bit block id that uniquely identifies/names the block. The sub-field 534 may also contain information as to whether the block is allocated or deallocated and information about the block layout on the segment.

In an embodiment, alignment of the various fields of the master and data segments of a volume may provide substantial improvement to read/write performance of the object store. Illustratively, the fields (e.g., header, chunk metadata, chunk, and recovery area) of the master and data segments are discrete disk locations (e.g., sectors) within the luns 550 of the disks 250. Starting offsets of these fields may be aligned to, e.g., a stripe width across the disks of a RAID group, to ensure that only required information is read/written when accessing a stripe. For example, if the stripe width is a multiple of the disk sector size (e.g., 512 KB), the starting offsets may be multiples of 512K. In particular, the starting offsets of one or more fields of the segments may be aligned with the striped width so that all of the required information from the field(s) may be accessed with, e.g., one read access.

In addition, by separating the master segment 520 from the data segments 510 of a volume 500, the contents of the volume may be implemented on mixed media to improve performance of the on-disk layout of the object store. For example, the master segment (which stores critical metadata content) can be stored on a medium, e.g., solid state disk (SSD) such as Flash, that is different from the medium used to store some or all of the data contents of the data segments, e.g., hard disk drive (HDD). To that end, information, such as metadata content, related to random input/output (I/O) operations and/or to sequential, small write operations may be stored on SSD, whereas information, such as data content, related to sequential I/O operations may be stored on HDD. In an embodiment, the storage system 200 may be constructed of mixed media in quantities such as approximately 80% of HDD (disks) and 20% of SSD (or Flash card), although it will be understood to those of skill in the art that other quantities may be advantageously utilized.

Incore Layout

Figure 6:
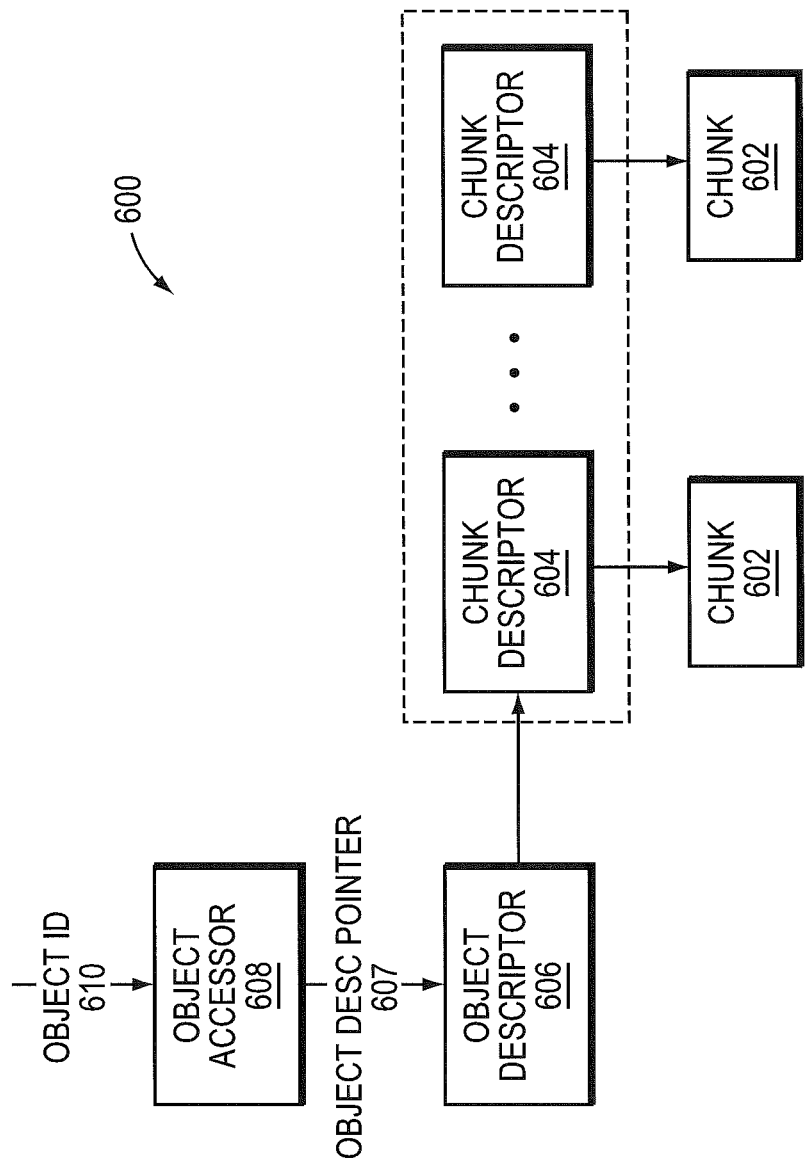
FIG. 6 is a block diagram of an incore layout of the object store of the distributed data processing system.

The information stored on the master segment 520 of a volume 500 is persistently stored on disk and, upon a startup or boot of a node 300, that information may be loaded into the memory 320 (i.e., incore) of the node. For instance, when the node is booted, the information may be loaded from the master segment 520 into memory 320 to populate incore data structures 600 used to identify and access data/chunks of a block. FIG. 6 is a block diagram of the incore layout of the object store that may be advantageously used with one or more embodiments described herein. Illustratively, the incore layout may be implemented as incore data structures 600 of the nodes. In-core, a chunk 602 is illustratively a location or area of memory 320 that stores the data content of the chunk. The memory area of the chunk 602 may be referenced (pointed to) by a corresponding data structure, e.g., a chunk descriptor 604, which contains chunk metadata that describes the chunk 602 with respect to, e.g., its size, an amount of data in the chunk, and/or a current state of the chunk (i.e., locked or unlocked).

As noted, the master segment 520 has an on-disk layout that contains information used to organize chunks as one or more blocks. In-core, however, each block is illustratively converted to an object. In other words, the on-disk layout of the object store utilizes a construct of a block stored on disk, whereas an incore layout of the object store utilizes a construct of an object stored in memory. Thus, in one or more embodiments, an on-disk block is equivalent to an incore object. Data structures, e.g., an object accessor 608 and an object descriptor 606, may be used to enable access to the object incore. Illustratively, the object accessor 608 may be a map or table data structure that contains one or more pointers, e.g., object desc pointer 607, to one or more object descriptors 606, each of which is essentially a linked list of chunk descriptors 604. Note that the chunk descriptors 604 may be linked together incore similar to the way chunks are linked together on disk. However, the object descriptor 606 is not published (provided) to, e.g, a client to enable access to an object; rather, an object identifier (object id 610) may be provided to the client. In one or more embodiments, the object id 610 is a 64-bit identifier that uniquely identifies an object; as used herein, the object id is illustratively equivalent to the 64-bit block id.

Figure 7:
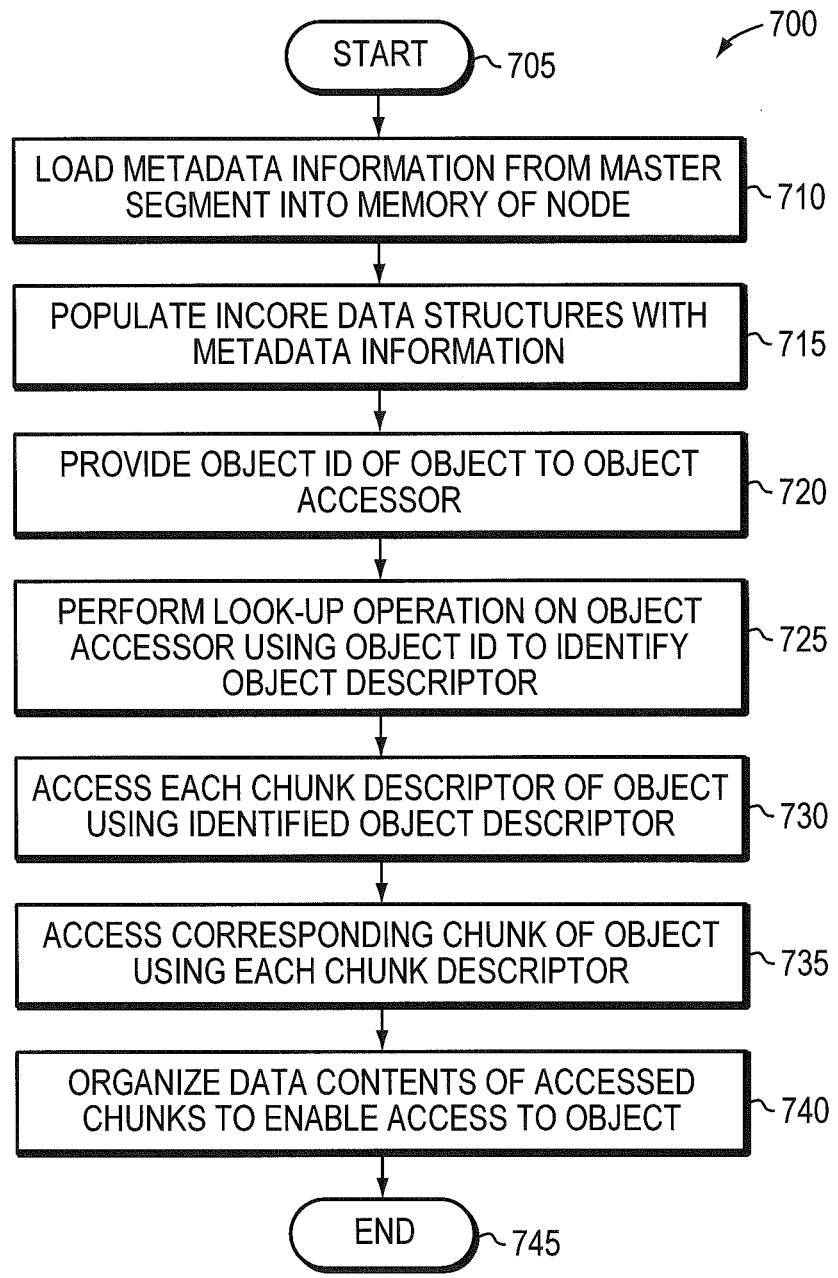
FIG. 7 is an example simplified procedure for accessing an object of the object store of the distributed data processing system.

FIG. 7 illustrates an example simplified procedure for accessing an object of the object store of distributed data processing system 100. The procedure 700 starts at step 705 and continues to step 710 where information, such as block layout metadata information, is loaded from master segment 520 into memory 320 of node 300 and, at step 715, the metadata information is used to populate incore data structures 600. For example, the block layouts for the data segments 510 of a volume 500 in the object store are loaded into the object accessor 608 during load time of node startup. At step 720, the object id 510 associated with the object is provided (e.g., by a client) to the object accessor 508 of node 300 and, in step 725, a look-up operation is performed on the object accessor to uniquely identify (via object desc pointer 607) an object descriptor 606. Illustratively, the object descriptor 606 enables indexing into various chunk descriptors 604 associated with chunks 602 of the object stored on the volume. At step 730, the identified object descriptor 606 is used to access each chunk descriptor 604 of the object (e.g., via a pointer) and, in step 735, each chunk descriptor 604 is used to access a corresponding chunk 602 of the object. At step 740, the data contents of the accessed chunks are organized in memory 320 to enable access to the object (e.g., by the client). The procedure then ends at step 745.

Advantageously, the object store described herein may be configured to service objects in a manner that is adaptable to various data management system deployments, including distributed file systems and/or distributed database management systems, that support object-level management utilizing, e.g., the quasi-shared storage system of the distributed data processing system.

While there have been shown and described illustrative embodiments that provide an object store that efficiently manages and services objects for use by clients of a distributed data processing system, it is to be understood that various other adaptations and modifications may be made within the spirit and scope of the embodiments herein. For example, embodiments have been shown and described herein with relation to deployment of the object store in an analytics framework such as Hadoop, which services data in the form of HDFS blocks for WORM workloads, but which may be configured to transform the HDFS blocks into objects of the object store. However, the embodiments in their broader sense are not so limited, and may, in fact, allow deployment of the object store in other frameworks that may access the data directly as objects, without the use the HDFS protocol, and/or for non-WORM workloads. For these other deployments, the object store functions substantially similar as with Hadoop. For example, a client (e.g., an application running on a computer external to the distributed data processing system) may request access (e.g., reading or writing) to an object serviced by a compute node of the distributed data processing system using a storage protocol (e.g., other than HDFS) that employs the 64-bit object id. The object id may then be presented to the compute node and, in particular, to the incore data structures of the object store to identify and access the chunk(s) constituting the object, as described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   mapping each compute node of a plurality of compute nodes to a different volume of a plurality of volumes that defines a logical arrangement of storage space of a storage system, wherein each compute node has read-write access to the volume to which the compute node is mapped and read-only access to those of the plurality of volumes not mapped to the compute node; and
   in response to receiving an identifier for a data object at a first compute node of the plurality of compute nodes,
      identifying an object descriptor associated with the identifier and a plurality of chunk descriptors referenced by the object descriptor, wherein the object descriptor and the plurality of chunk descriptors are arranged on the first compute node according to an incore layout;
      utilizing the plurality of chunk descriptors to retrieve, via a network from the plurality of volumes, blocks of data stored according to an on-disk layout of the plurality of volumes, wherein the blocks of data include a plurality of chunks described by the plurality of chunk descriptors;
      the first compute node assembling the plurality of chunks described by the plurality of chunk descriptors into the data object; and
      returning the assembled data object.

2. The method of claim 1, wherein read-write access and read-only access assignments for the plurality of compute nodes are indicated in a configuration file; wherein the configuration file loaded into memory of each of the plurality of compute nodes upon booting up.

3. The method of claim 1 further comprising:
   in response to a failure of a first compute node of the plurality of compute nodes which has read-write access to a first unique set of volumes of the plurality of volumes,
      routing read requests directed to the first unique set of volumes to compute nodes in the plurality of compute nodes other than the first compute node; and
      routing write requests directed to the first compute node to a second compute node of the plurality of compute nodes, wherein the second compute node executes the write requests on a second unique set of volumes of the plurality of volumes.

4. The method of claim 1 further comprising:
   in response to detecting a change to a first chunk of the plurality of chunks by the first compute node,
      updating, by a second compute node of the plurality of compute nodes, a chunk descriptor in metadata in memory of the second compute node to reflect the change to the first chunk, wherein the chunk descriptor describes the first chunk; and
   in response to detecting an error during the update of the chunk descriptor in the metadata, performing a reboot of the second compute node to reload the metadata in the memory of the second compute node.

5. The method of claim 1 further comprising:
   routing write requests directed to a first unique set of volumes of the plurality of volumes to the first compute node, wherein the first compute node has been assigned read-write access to the first unique set of volumes; and
   performing load balancing of read requests directed to the first unique set of volumes across each of the plurality of compute nodes.

6. The method of claim 1 further comprising:
   storing block layout information on a master segment of a first volume the plurality of volumes, wherein the block layout information describes locations of the blocks of data and the plurality of chunks in the plurality of volumes;
   loading the block layout information from the master segment in memory of at least the first compute node; and
   utilizing the block layout information to link each of the plurality of chunk descriptors to the plurality of chunks stored in the blocks of data.

7. The method of claim 1, wherein a first chunk descriptor of the plurality of chunk descriptors comprises metadata that describes a location of a chunk with respect to a block of data on the plurality of volumes and a size of the chunk.

8. A computer readable medium having computer executable instructions stored therein, the instructions to:
   map each compute node of a plurality of compute nodes to a different volume of a plurality of volumes that defines a logical arrangement of storage space of a storage system, wherein each compute node has read-write access to the volume to which the compute node is mapped and read-only access to those of the plurality of volumes not mapped to the compute node; and
   in response to receipt of an identifier for a data object at a first compute node of the plurality of compute nodes,
      identify an object descriptor associated with the identifier and a plurality of chunk descriptors referenced by the object descriptor, wherein the object descriptor and the plurality of chunk descriptors are arranged on the first compute node according to an incore layout;
      utilize the plurality of chunk descriptors to retrieve blocks of data from the plurality of volumes, wherein the blocks of data are stored according to an on-disk layout of the plurality of volumes, wherein the blocks of data include a plurality of chunks described by the plurality of chunk descriptors;
      assemble the plurality of chunks described by the plurality of chunk descriptors into the data object; and
      return the assembled data object.

9. The computer readable medium of claim 8, wherein read-write access and read-only access assignments for the plurality of compute nodes are indicated in a configuration file; wherein the configuration file loaded into memory of each of the plurality of compute nodes upon booting up.

10. The computer readable medium of claim 8 further comprising instructions to:
in response to a failure of a first compute node of the plurality of compute nodes which has read-write access to a first unique set of volumes of the plurality of volumes,
route read requests directed to the first unique set of volumes to compute nodes in the plurality of compute nodes other than the first compute node; and
route write requests directed to the first compute node to a second compute node of the plurality of compute nodes, wherein the second compute node executes the write requests on a second unique set of volumes of the plurality of volumes.

11. The computer readable medium of claim 8 further comprising instructions to:
in response to detection of a change to a first chunk of the plurality of chunks by the first compute node,
update, by a second compute node of the plurality of compute nodes, a chunk descriptor in metadata in memory of the second compute node to reflect the change to the first chunk, wherein the chunk descriptor describes the first chunk; and
in response to detection of an error during the update of the chunk descriptor in the metadata, perform a reboot of the second compute node to reload the metadata in the memory of the second compute node.

12. The computer readable medium of claim 8 further comprising instructions to:
route write requests directed to a first unique set of volumes of the plurality of volumes to the first compute node, wherein the first compute node has been assigned read-write access to the first unique set of volumes; and
perform load balancing of read requests directed to the first unique set of volumes across each of the plurality of compute nodes.

13. The computer readable medium of claim 8 further comprising instructions to:
store block layout information on a master segment of a first volume of the plurality of volumes, wherein the block layout information describes locations of the blocks of data and the plurality of chunks in the plurality of volumes;
load the block layout information from the master segment in memory of at least the first compute node; and
utilize the block layout information to link each of the plurality of chunk descriptors to the plurality of chunks stored in the blocks of data.

14. The computer readable medium of claim 8, wherein a first chunk descriptor of the plurality of chunk descriptors comprises metadata that describes a location of a chunk with respect to a block of data on the plurality of volumes and a size of the chunk.

15. An apparatus comprising:
a processor; and
a machine-readable medium having program code executable by the processor to cause the apparatus to,
map each compute node of a plurality of compute nodes to a different volume of a plurality of volumes that defines a logical arrangement of storage space of a storage system, wherein each compute node has read-write access to the volume to which the compute node is mapped and read-only access to those of the plurality of volumes not mapped to the compute node; and
in response to receipt of an identifier for a data object at a first compute node of the plurality of compute nodes,
identify an object descriptor associated with the identifier and a plurality of chunk descriptors referenced by the object descriptor, wherein the object descriptor and the plurality of chunk descriptors are arranged on the first compute node according to an incore layout;
utilize the plurality of chunk descriptors to retrieve, from the plurality of volumes via a network, blocks of data stored according to an on-disk layout of the plurality of volumes, wherein the blocks of data include a plurality of chunks described by the plurality of chunk descriptors;
the first compute node assemble the plurality of chunks described by the plurality of chunk descriptors into the data object; and
return the assembled data object.

16. The apparatus of claim 15, wherein read-write access and read-only access assignments for the plurality of compute nodes are indicated in a configuration file; wherein the configuration file loaded into memory of each of the plurality of compute nodes upon booting up.

17. The apparatus of claim 15 further comprising program code executable by the processor to cause the apparatus to:
in response to a failure of a first compute node of the plurality of compute nodes which has read-write access to a first unique set of volumes of the plurality of volumes,
route read requests directed to the first unique set of volumes to compute nodes in the plurality of compute nodes other than the first compute node; and
route write requests directed to the first compute node to a second compute node of the plurality of compute nodes, wherein the second compute node executes the write requests on a second unique set of volumes of the plurality of volumes.

18. The apparatus of claim 15 further comprising program code executable by the processor to cause the apparatus to:
in response to detection of a change to a first chunk of the plurality of chunks by the first compute node,
update, by a second compute node of the plurality of compute nodes, a chunk descriptor in metadata in memory of the second compute node to reflect the change to the first chunk, wherein the chunk descriptor describes the first chunk; and
in response to detection of an error during the update of the chunk descriptor in the metadata, perform a reboot of the second compute node to reload the metadata in the memory of the second compute node.

19. The apparatus of claim 15 further comprising program code executable by the processor to cause the apparatus to:
route write requests directed to a first unique set of volumes of the plurality of volumes to the first compute node, wherein the first compute node has been assigned read-write access to the first unique set of volumes; and
perform load balancing of read requests directed to the first unique set of volumes across each of the plurality of compute nodes.

20. The apparatus of claim 15 further comprising program code executable by the processor to cause the apparatus to:

store block layout information on a master segment of a first volume of the plurality of volumes, wherein the block layout information describes locations of the blocks of data and the plurality of chunks in the plurality of volumes;
load the block layout information from the master segment in memory of at least the first compute node; and
utilize the block layout information to link each of the plurality of chunk descriptors to the plurality of chunks stored in the blocks of data.

* * * * *